United States Patent [19]

Raythatha et al.

[11] Patent Number: 4,920,086

[45] Date of Patent: Apr. 24, 1990

[54] MIXED PILLARED CLAY REDUCTION PRODUCTS AND METHOD OF PREPARATION

[76] Inventors: Rasik H. Raythatha, 329 Franklin St., Tennille, Ga. 31489; Bruce Tatarchuk, Rte. 2, Box 189F, Auburn, Ala. 36830; Woo Y. Lee, 500 Northside Cir., Apt. Q9, Atlanta, Ga. 30309

[21] Appl. No.: 180,342

[22] Filed: Apr. 11, 1988

Related U.S. Application Data

[63] Continuation-in-part of Ser. No. 70,433, Jul. 7, 1987, abandoned.

[51] Int. Cl.⁵ .......................... B01J 29/06; B01J 21/16
[52] U.S. Cl. ...................................... 502/63; 502/80; 502/84; 501/148
[58] Field of Search ............................ 502/63, 80, 84; 501/148

[56] References Cited

U.S. PATENT DOCUMENTS

| | | | |
|---|---|---|---|
| 4,176,090 | 11/1979 | Vaughan et al. | 502/84 |
| 4,216,188 | 8/1980 | Shabrai et al. | 502/63 |
| 4,238,364 | 12/1980 | Shabtai | 502/65 |
| 4,248,739 | 2/1981 | Vaughan et al. | 502/84 |
| 4,271,043 | 6/1981 | Vaughan et al. | 502/84 |
| 4,436,832 | 3/1984 | Jacobs et al. | 502/84 |
| 4,465,892 | 8/1984 | Jacobs et al. | 585/666 |
| 4,510,257 | 4/1985 | Lewis et al. | 502/84 |
| 4,515,901 | 5/1985 | Elattar | 502/84 |
| 4,621,070 | 11/1986 | Pinnavaia et al. | 502/63 |
| 4,629,712 | 12/1986 | Pinnavaia et al. | 502/63 |
| 4,637,991 | 1/1987 | Battiste et al. | 502/84 |
| 4,665,044 | 5/1987 | Pinnavaia et al. | 502/84 |
| 4,666,877 | 5/1987 | Vaughan | 502/84 |
| 4,855,268 | 8/1989 | Raythatha | 502/63 |

OTHER PUBLICATIONS

Sancier et al., "ESR Evidence of Hydrogen Migration on Supported Metal Catalysts", Journal of Catalysis, 11 (1968), pp. 135–142.
Lee et al., "Pillared-Clay Catalysts Containing Mixed-Metal Complexes", Journal of Catalysis, 115 (1989), pp. 159–179.

Primary Examiner—Mark L. Bell
Assistant Examiner—Anthony J. Green
Attorney, Agent, or Firm—Klauber & Jackson

[57] ABSTRACT

Mixed pillared clays having good thermal stabilities and high surface areas made by liquid phase methods in which an aluminum hydroxy polymer and at least one separate transition metal hydroxy polymer are prepared and mixed with a swelling clay in respective amounts to satisfy selected percentages of the cationic exchange capacity of the clay, are reduced to produce metallic transition metal domains.

15 Claims, 7 Drawing Sheets

SCHEMATIC STRUCTURE OF
SODIUM MONTMORILLONITE 2.5A  EXCHANGEABLE CATIONS
nH₂O

○ OXYGENS  ⊙ HYDROXYLS  ● ALUMINUM, IRON, MAGNESIUM
○ AND ● SILICON, OCCASIONALLY ALUMINUM

HYPOTHETICAL SCHEMATIC OF
BIMETALLIC OR MIXED POLYHYDROXY
METAL IONS PILLARED MONTMORILLONITE

CATALYTICALLY ACTIVE SPECIES ITSELF
ACTS AS PILLAR ALONG WITH INERT PILLARS

CATALYTICALLY ACTIVE CENTER M' INCORPORATED
IN INERT PILLARS OF METAL M

BASAL SPACINGS OF CLAYS AFTER
DRYING AT ROOM TEMPERATURE

BASAL SPACINGS OF CLAYS AFTER DRYING AT 550°C.

- IRON PILLAR
- ALUMINUM PILLAR
- METALLIC IRON PHASE
- IRON OXIDE PHASE

MIXED PILLARED CLAY REDUCTION PRODUCTS AND METHOD OF PREPARATION

This application is a continuation-in-part of U.S. Ser. No. 070,433 filed on Jul. 7, 1987, now abandoned.

FIELD OF THE INVENTION

This invention relates to a process of pillaring swelling clays with more than one metal cation and to further reactions and the products.

BACKGROUND OF THE INVENTION

Naturally occurring clay minerals are regularly used in many applications. For example, catalyst, paper, plastic, health care, petroleum exploration and adsorbent applications are known. Of particular interest are clays known as swelling clays. Typical of these are the smectite clays. The term "swelling" refers to the expansion of the clays in the C-dimension of its natural crystalline state, when exposed to water. A schematic representation of a swelling clay, sodium montmorillonite, is illustrated in FIG. 1.

In the fully expanded state, the surface area of swelling clays is theoretically calculated to be of the order of 750 m$^2$/g. In practice this surface area is not available for reaction when clays are heated above 150° C. The reason for non-accessibility is the diffusion of interlayer solvent out of the clay layers at higher temperatures, causing strong layer to layer Van der Waal contacts. To circumvent this, a number of modifications have been proposed. Among the most successful is the intercalation of metal hydroxy polymer cations followed by heating above 200° C. In the literature this process is referred to as pillaring or cross-linking. Among the most widely explored, inorganic polymers were synthesized by hydrolysis of water soluble salts of aluminum, iron, chromium, bismuth, magnesium, zirconium, and nickel at an appropriate pH. In addition, references are known where pillaring species are derived from molybdenum, niobium, silicon and other metal ions.

Commonly, pillared clays are prepared by ion exchange of cationically charged metal hydroxy polymers with sodium ions of clays. The typical exchange reactions are conducted at temperatures around 70° C. for three hours or at room temperature over a longer period of time. In the less common method, metal hydroxy polymers are synthesized by an in situ method in the interlayers. In this case, known amounts of metal salts and an inorganic base, sodium hydroxide, are stirred with clays at room temperature for a time longer than 10 hours. Typically the ratios of hydroxyl groups to metal are in the range of 1.5 to 3.0. It has been suggested that in this range of OH/metal ratios the polymers formed are of the biggest possible size. For pillaring, bigger size cations are preferred for two reasons. First, bigger cations interact more strongly with clay layers and thus would bond preferentially. Secondly, bigger cations provide higher C-dimension expansion.

In almost all of the work described in the literature, pillaring or cross-linking of clays is carried out by intercalation of only a mono-metallic metal hydroxy polymer. This invention demonstrates pillaring of clays from a different perspective: to create multi-metallic intercalants. In the subject process, two distinctly different, chemically as well as physically, metal hydroxy polymers are intercalated in the same interlayer voids, see FIG. 2A. In addition, pillaring is also carried out using a discretely synthesized multi-metallic hydroxy polymer prior to cation exchange reactions, see FIG. 2B. Such products are designated as mixed pillared clays (MPC). A schematic representation of both types of MPCs is provided in FIGS. 2A and 2B respectively.

Objects of the present invention are to provide techniques of producing novel pillared clays instrumental in enabling specific catalytic reactions to be carried out by virtue of the highly structured interlayers of the clays; to provide unique ways of producing high surface area clays where one pillar acts simply as an inert prop and the other pillar can be used to carry out catalytic reactions; and to enable generating metallic clusters of size that cannot be produced by other techniques. The small metallic clusters are extremely reactive and very important in catalyst applications. The use of multi-metallic discrete metal complexes would allow almost monoatomic separation of active metals sites in an inert matrix.

Further objects are to develop preparation methods for synthesizing mixed pillared clays containing separate, discrete iron pillars and separate, discrete aluminum pillars and to carry out reduction of iron in these mixed pillared clays with emphasis on the synthesis of small iron crystallites; and thereby obtain reduced mixed pillared clays of good stability at elevated temperatures.

In U.S. Pat. 4,176,090 to David E. W. Vaughan et al, Example 13 describes an Al-Mg polymer for interlayering smectite. However, the method of making this material is significantly different, i.e., it is solid state polymerization. There is no disclosure either of preparing a discrete, multimetallic hydroxy polymer prior to cation exchange reaction with a swelling clay or of preparing two different metal hydroxy polymers and mixing them in desired proportions with the swelling clay.

In U.S. Pat. 4,271,043 to David E. W. Vaughan et al at column 5, lines 19-25, the term "copolymerizing" is used in a different sense. The actual purpose is to stabilize the colloidal system by addition of small amounts of sodium silicate and other compounds. As to what is absent from the disclosure, the above comments apply. A similar description is found in U.S. Pat. 4,248,739 at column 2, lines 30-33 and 55-62. Once more, this is not true copolymerization but the addition of separate cations to already polymerized species, see Example 12. This is much different from actual copolymerization.

Sancier and Inami in J. Catalysis, Vol. 11, 135 (1968) reported reduction of supported iron oxides to metallic iron in the presence of either Pd or Pt via hydrogen spillover. The catalyst samples containing Pt (0.5%) and Fe$_2$O$_3$ (0.05% Fe) supported on either Al$_2$O$_3$ or SiO$_2$ were prepared by impregnation. Upon reduction of these samples in hydrogen at 770K for 16 hours, their ESR results indicated the formation of the metallic iron domains (i.e., g value of 2.10). However, in the absence of platinum the formation of the metallic iron phase was not observed. Based on these observations, Sancier and Inami concluded that the mechanism of the iron oxide reduction occurred by a sequence of events including: (i) hydrogen chemisorption on platinum, (ii) hydrogen transfer to the support and to iron oxide sites and (iii) subsequent coalescing of iron to form the ferromagnetic domains.

Of general interest are U.S. Pats. 4,436,832 and 4,465,892, also U.S. Pat. 4,238,364.

Pillared clays may be utilized as adsorbents, catalysts, catalytic supports and for other purposes as discussed in the literature.

SUMMARY OF THE INVENTION

The MPCs (mixed pillared clays) are prepared by two different methods. In the first method, a discrete cationic hydroxy polymer is synthesized using varying proportions of, e.g., iron and aluminum salts followed by exchanging them for sodium ions of a swelling clay, e.g., montmorillonite. When used in connection with this first method, the term "discrete" refers to a single, definite species with exactly defined proportions of each of the metals, viz., a definite organic complex or compound. In the second method, iron and aluminum polyhydroxy cations are prepared separately. These ions are then used to replace sodium ions of montmorillonite using varying stoichiometric amounts. The required stoichiometric amounts were calculated by determining what percent of clay cation exchange capacity (CEC) should be satisfied by the aluminum hydroxy polymer and what percent by iron polyhydroxy cations to maintain charge neutrality. A list of MPCs synthesized using these techniques is provided in Table 1.

It should be noted that in both methods preparation of pillaring species is carried out before the clay is brought into contact therewith, viz., either a multi-metallic hydroxy polymer or at least two separate metal hydroxy polymers. In this specification the pillared clays resulting from the first method may also be described as containing alloy pillars, i.e., several metals being located in the same pillar; and those from the second method as containing more than one species of monometallic pillars, i.e., each metal being located in a separate or individual pillar, as discussed more fully hereinafter.

It will be seen from the following detailed description that the pillaring agents are prepared and used in the liquid phase so that these methods are essentially liquid phase methods.

To date, clays intercalated with mono-metallic pillars have received primary attention. The present invention, however, is concerned with pillared clays containing mixed metal complexes. Discrete metal pillars of iron oxide and aluminum oxide were simultaneously intercalated into montmorillonite to produce mixed pillared systems. Mixed pillared clays were prepared and served as precursor materials for the synthesis of small iron crystallites during subsequent reduction. It has now been found that reduction-resistant aluminum oxide pillars can preserve the structure of the pillared clay sufficiently so that it can serve as a matrix to facilitate the nucleation and growth of iron crystallites in the absence of sintering. Pillared clays can be used as high surface area metallic or bimetallic catalyst supports providing close control of crystallite size along with the inherent shape selectivity dictated by the interlayer dimensions of the clay.

The stability and sinter-resistant nature of reduced iron domains formed within the framework supplied by mixed pillared precursors appears to provide a good means for preparing and stabilizing small iron crystallites. These crystallites, coupled with the shape-selective nature of the support and its apparent thermal stability in reduction-oxidation environments up to 723° K., provide a unique set of physical characteristics with catalytic applications in Fischer-Tropsch synthesis, hydrodesulfurization, reforming, etc.

For supported catalysts, interaction between metal and support is one of the most important factors determining the ultimate particle size and the particle size stability to thermal and chemical treatments. For example, a too weak interaction between metal and support may lead to a sintering of metal particles at high temperatures, whereas a strong interaction may cause a stabilization of metal oxides.

For understanding the reduction behavior of pillared clays containing only discrete iron pillars, the pillars may be simply thought of as supported small iron oxide particles on silica. This is a valid assumption, since the pillars are sandwiched between silicate surfaces of clays and are expected to interact with the silicate surfaces upon reduction. It is known that iron oxides supported on silica are difficult to reduce to small metallic iron particles due to a strong interaction between iron and silica. For pillared clays containing a mixture of discrete iron and aluminum pillars, a further complication arises from the fact that iron may interact with the aluminum pillars during reduction.

DETAILED DESCRIPTION

Figure 1:
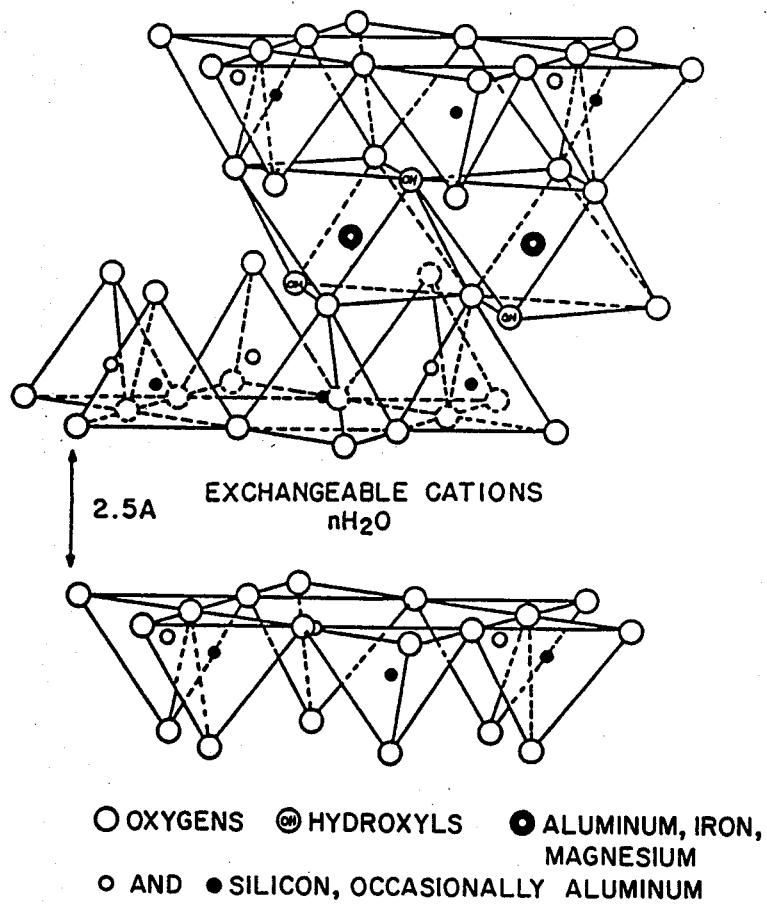
FIG. 1 illustrates the schematic structure of sodium montmorillonite.

In connection with the following description, reference should be made to Tables 1, 2 and 3.

Using the above noted pillaring agents, five distinctly different pillared clays were prepared. In general, these were clays intercalated with: (i) discrete aluminum pillars; (ii) discrete iron pillars; (iii) a mixture of discrete iron pillars and discrete aluminum pillars comprising 75% of the CEC of sodium montmorillonite and 25% of the CEC, respectively; (iv) a mixture of discrete iron pillars and discrete aluminum pillars comprising 50% of the CEC and 50% of the CEC, respectively; and (v) alloy pillars.

In connection with these preparations, Mossbauer spectroscopy, XRD, BET surface area measurements, controlled atmosphere electron microscopy (CAEM) and transmission electron microscopy (TEM) were used to investigate the behavior on reduction and the structural properties of mixed pillared clays as a function of appropriate chemical treatments. Pillared clays containing more than one species of mono-metallic pillars (i.e., iron and aluminum) and alloy pillars (i.e., iron and aluminum located in the same pillar) were investigated for comparison purposes to distinguish and ascertain the chemical integrity and the stability of the mixed pillared systems.

Preparation of Sodium Montmorillonite

The swelling clay, montmorillonite, used was a commercial product, Mineral Colloid B.P., supplied by Southern Clay Products, Inc. This montmorillonite was saturated with sodium ions by stirring with 1M sodium chloride for 24 hours. The sodium saturated clay was then washed free of excess salt and freeze dried. The cation exchange capacity (CEC) of sodium saturated montmorillonite was determined by re-exchange of sodium ions by ammonium and then analyzing for ammonium ions. The ammonium concentration wa determined by Gailbraith Laboratory and reported as percent nitrogen. The percent nitrogen was then converted back to ammonium ion concentration. In the calculation, correction was made for a very small amount of nitrogen that is found in natural clays. The cation exchange capacity determined by this method was 82 meq/100g of montmorillonite.

In the following discussion, the series PA-1, PA-2, etc., refers to pillaring agents designated by number; the series S-A, S-B, etc., refers to synthesis of pillared and mixed pillared clays, designated by letter.

Pillaring Agents

PA-1. $[Al_{13}O_4(OH)_{24}]Cl_7$

This aluminum hydroxy polymer was purchased from Reheis Chemicals Co. It is commercially known as Chlorohydrol. The active ingredient was 50% by weight.

PA-2. $[Fe_3(OH)_4]Cl_5$ 5.9845g. of ferric trichloride hexahydrate supplied by Aldrich Chemicals Co. was dissolved in 225 mls. of distilled water. Then a solution containing 2.3469g. sodium carbonate in 100 mls. water was added slowly. The amount of metal chloride and sodium carbonate used would give an effective OH/M (hydroxyl to metal) ratio of 2.0. The resulting solution was aged at 95° C. for 36 hours. The end solution was extremely dark brown with a pH of 1.58. The stock solution of this polymer was prepared by making the solution exactly to 325 mls. Portions of this stock solution were used directly for pillaring reactions.

PA-3. $[Al_{12.5}Fe_{0.5}O_4(OH)_{24}]Cl_7$ 7.0666g. of aluminum trichloride hexahydrate supplied by Aldrich Chemical Co. and 0.3164g. of ferric trichloride hexahydrate were dissolved in 100 mls. of distilled water. Then a solution containing 0.3164g of sodium carbonate in 50 mls. of water was added slowly, OH/M=2.5. The resulting solution was allowed to age at 95° for 36 hours to form a solution of discrete bimetallic hydroxy polymer containing aluminum and ferric ions in the ratio of 12.5/0.5. The pH of the final solution was 2.76 and was used directly for intercalation.

PA-4. $[Al_{10}Fe_3O_4(OH)_{24}]Cl_7$

The method of preparation of this polymer is essentially identical to the one used in the preparation of PA-3 except that the amounts of aluminum trichloride, ferric trichloride and sodium carbonate were 5.6536 g, 1.8984 g and 4.03249 g respectively. The OH/M ratio of the solution was 2.5. The final pH of the solution was 2.56. The entire solution was later used for pillaring.

PA-5. $[Al_6Fe_7O_4(OH)_{24}]Cl_7$

The method of preparation of this polymer is essentially identical to the one used in the preparation of PA-4, except that the amounts of aluminum trichloride, iron trichloride and sodium carbonate were 3.3951 g, 4.4329 g and 4.03569 g respectively. The OH/M ratio of the solution was 2.5. The final pH of the solution was 2.45 and the entire solution was used directly for intercalation.

Pillaring Agents Containing Enriched Iron-57 Isotopes

In order to study structures and chemical states of the pillars in MPCs, the Mossbauer technique was employed. In the technique, iron atoms are used as a probe. Thus, two hydroxy polymers were prepared using Iron-57 enriched ferric trichloride.

Preparation of $^{57}Fe$ Enriched Ferric Trichloride

A stock solution of $FeCl_3$ was prepared by dissolving 0.0144 g of ferric oxide, 93.7% enriched with $^{57}Fe$, in 2 ml. of concentrated hydrochloric acid (12M) at room temperature and diluting to 10 mls. with distilled water. The resulting solution contained 0.002439 g. of $^{57}Fe$ enriched ferric chloride per milliliter of the solution. Isotope enriched ferric oxide was obtained from the Isotope Division of the Oak Ridge National Laboratory.

Preparation of $^{57}Fe$ Enriched Pillaring Agents

PA-6. $[Al_{12.5}Fe_{0.5}O_4(OH)_{24}]Cl_7$ for MPC-1

5.6580 g. of $AlCl_3.6H_2O$ and 0.2497 g. of non-enriched $FeCl_3.6H_2O$ were dissolved in 98 mls. of water, followed by addition of 1.5 ml. of a stock solution containing enriched ferric chloride. The solution was allowed to mix for five minutes. Then a solution containing 3.4150 g of sodium carbonate in 50 mls. of water was added slowly. The amount of sodium carbonate added was enough to neutralize excess hydrochloric acid, used to prepare enriched ferric chloride, and also to give an OH/M ratio of 2.5. The resulting solution was aged at 95° C. for 36 hours; pH=2.1. The entire solution was later used for pillaring. The use of enriched iron gave 63% enrichment of $^{57}Fe$ in the polymer over an identical polymer containing no enriched ferric ions.

PA-7 $[Fe_3(OH)_4]Cl_5$ for PC-2

This pillaring agent is prepared using unenriched and enriched ferric trichlorides. 1.2300 g. of unenriched ferric chloride was dissolved in 75 mls. of water. Then 1.0 ml. solution of enriched ferric chloride was added. This was followed by addition of a solution containing 0.6076 g. of sodium carbonate in 25 mls. of water. Once again the amount of sodium carbonate was enough to neutralize excess HCl; and provide an OH/M ratio of 2.0. The resulting solution was aged at 95° C. for 36 hours and used in its entirety for the preparation of pillared clay. The enrichment of $^{57}Fe$ in the final polymer was 8.6%.

PA-8 $[Fe_3(OH)_4]Cl_5$ for MPC-4

The general method of preparation is similar to that described in the synthesis of PA-7. However, the amounts of unenriched ferric chloride, enriched ferric chloride and sodium carbonates were 1.3224 g, 3 mls. and 0.8945 g respectively. The amount of enriched ferric chloride used was enough to give 24% enrichment of $^{57}$Fe in the final polymer.

PA-9. [Fe$_3$(OH)$_4$]Cl$_5$ for MPC-5

The general method of preparation is similar to that described in the synthesis of PA-7. However, the amounts of unenriched ferric trichloride, enriched ferric trichloride and sodium carbonate were 0.8618 g, 2.5 mls. and 0.6488 g respectively. The amount of enriched ferric chloride used was enough to give 31% enrichment of $^{57}$Fe in the final polymer.

Preparation of Pillared and Mixed Pillared Clays

S-A. Synthesis of Aluminum Pillared Clay (PC-1)

This pillared clay was prepared according to the procedure described in the literature by Pinnavaia et al. In the procedure, 5.0 g. of freeze-dried sodium saturated montmorillonite was slurried in 500 mls. of water to form a suspension of about 1.0% by weight. This slurry was slowly added to a solution containing 5.0207 g of Chlorohydrol in 50 mls. of water with vigorous stirring. The amount of Chlorohydrol used was equivalent to four times CEC (cation exchange capacity) of 5.0 g. of montmorillonite. The resulting slurry was stirred at 65° for two hours, cooled and washed repeatedly with distilled water to remove excess unexchanged pillaring agent. The pillared clay was then freeze-dried.

S-B. Synthesis of Iron Pillared Clays (PC-2)

The pillaring species was [Fe$_3$(OH)$_4$]Cl$_5$. The cation exchange procedure to produce the pillared clay was identical to the one described in the method of S-A except that this time 150 mls. of a stock solution of pillaring agent, PA-2, was used. The amount of pillar in the stock solution used was equivalent to four times available CEC of 5.0 g of sodium montmorillonite.

S-C. Synthesis of Mixed Pillared Clay (MPC-1)

The amount of sodium montmorillonite and cation exchange procedure were identical to that of method S-B except that this time the entire amount of pillaring agent, [Al$_{12.5}$Fe$_{0.5}$O$_4$(OH)$_{24}$]Cl$_7$, prepared as PA-3, was added to the slurry. The amount of pillar used was four times the cation exchange capacity of the clay used.

S-D. Synthesis of Mixed Pillared Clay (MPC-2)

The amount of sodium montmorillonite and cation exchange procedure were identical to that of method S-C except that this time the entire amount of pillaring agent, [Al$_{10}$Fe$_3$O$_4$(OH)$_{24}$]Cl$_7$, prepared as PA-4, was added to the slurry. The amount of pillar was four times the cation exchange capacity of the clay used.

S-E. Synthesis of Mixed Pillared Clay (MPC-3)

The amount of sodium montmorillonite and cation exchange procedure were identical to that of method S-D except that this time the entire amount of pillaring agent, [Al$_6$Fe$_7$O$_4$(OH)$_{24}$]Cl$_7$, prepared as PA-5, was added to the slurry. The amount of pillar was equivalent to four times the cation exchange capacity of the clay used.

S-F. Synthesis of Mixed Pillared Clay (MPC-4)

In the synthesis of this pillared clay two discrete polymers, Chlorohydrol and [Fe$_3$(OH)$_4$]Cl$_5$, are used in the stoichiometric amounts so that each would satisfy 50% CEC of sodium montmorillonite. Appropriate adjustments were applied in the calculation of the amounts of pillaring agents required considering the cationic charges of Chlorohydrol and [Fe$_3$(OH)$_4$]Cl$_5$ to be 7+ and 5+ respectively. The pillaring reaction was as follows. 5.0 g. of sodium montmorillonite was dispersed in 500 mls. of distilled water and stirred for 24 hours. This slurry was then added to the solution containing 2.5104g. of Chlorohydrol and 75 mls. of a stock solution of [Fe$_3$(OH)$_4$]Cl$_5$, PA-2. The resulting slurry was stirred at 65° C. for two hours, cooled, washed free of unexchanged pillaring agents and freeze-dried.

S-G. Synthesis of Mixed Pillared Clay (MPC-5)

The amount of sodium montmorillonite, pillaring agents and the exchange process were identical to that used in the method S-F except, that the amount of iron pillar was 100 mls. of a stock solution of PA-2 and 1.2552 g of Chlorohydrol was used. These amounts translate to 75% CEC compensated by the iron pillar and the remaining 25% by the aluminum hydroxy polymer. Chlorohydrol.

Preparation of $^{57}$Fe Enriched Mixed Pillared Clays

S-H. Synthesis of Iron Pillared Clay (PC-2)

Essentially the procedure and pillaring species were the same as method S-B, except that the pillaring agent was PA-7. The amount of clay used was 2.5 g. The amount of pillaring agent was equivalent to three times CEC of the montmorillonite.

S-I. Synthesis of Mixed Pillared Clay (MPC-1)

Essentially the procedure and pillaring species were the same as method S-C, except that the pillaring agent was PA-6. The amount of clay used was 4.0 g. The amount of pillaring agent used was equivalent to three times CEC of the montmorillonite.

S-J. Synthesis of Mixed Pillared Clay (MPC-4)

Essentially the procedure and pillaring species were identical to that of method S-F, except that one component of the iron pillaring agent was PA-8. The amount of clay used was 4.0 g. The amount of pillaring agents used was equivalent to three times CEC of the montmorillonite.

S-K. Synthesis of Mixed Pillared Clay (MPC-5)

Essentially the procedure and pillaring species were identical to method S-G, except that one component of the iron pillaring agent was PA-9. The amount of clay was 2.5 g. The amount of pillaring agents used was equivalent to three times CEC of montmorillonite.

CHARACTERIZATION

X-Ray Diffration

Basal spacings of sodium montmorillonite and all pillared clays, freeze-dried and after heating at various temperatures, were measured using a Diablo X-ray diffractometer. Copper K$\alpha$ was the source of X-ray radiation, $=1.5405$ Å. The sample were scanned from 2.0 to 35.0 degree at step scan of 0.02 and scanning rate of 1° per minute. XRD samples for XRD were prepared by powder pack technique.

Surface Area

Surface area of sodium montmorillonite and pillared clays, freeze-dried and after heating at various temperatures, were measured using BET surface area equipment of Micromeritics. All samples were outgassed at 150° C. using helium as a carrier gas. The measurements were conducted at liquid nitrogen temperature.

Thus high surface area pillared clays were prepared from naturally occurring montmorillonite by exchanging interlayer ions with polyoxocations containing: (1) iron, (2) aluminum, (3) discrete mixtures of (1) and (2), or (4) iron and aluminum contained within the sam complex.

All freeze-dried pillared clays were in the form of powders wherein the colors varied with the nature of the pillaring species. Aluminum pillared clay is white whereas iron pillared clay is deep brown. Mixed pillared clays prepared by intercalation of discrete complexes, MPC 1 to 3, see Table 1, tend to be very light brown, whereas MPC 4 and 5 prepared by intercalation with stoichiometric methods, retain the brown color but the intensity depends on the amount of iron hydroxy polymer used. These results are a qualitative indicator of the differences in the pillaring species and also the pillared clays. In addition, the thixotropic characteristic of $Na^+$-montmorillonite in water changed significantly on pillaring.

Figure 3:
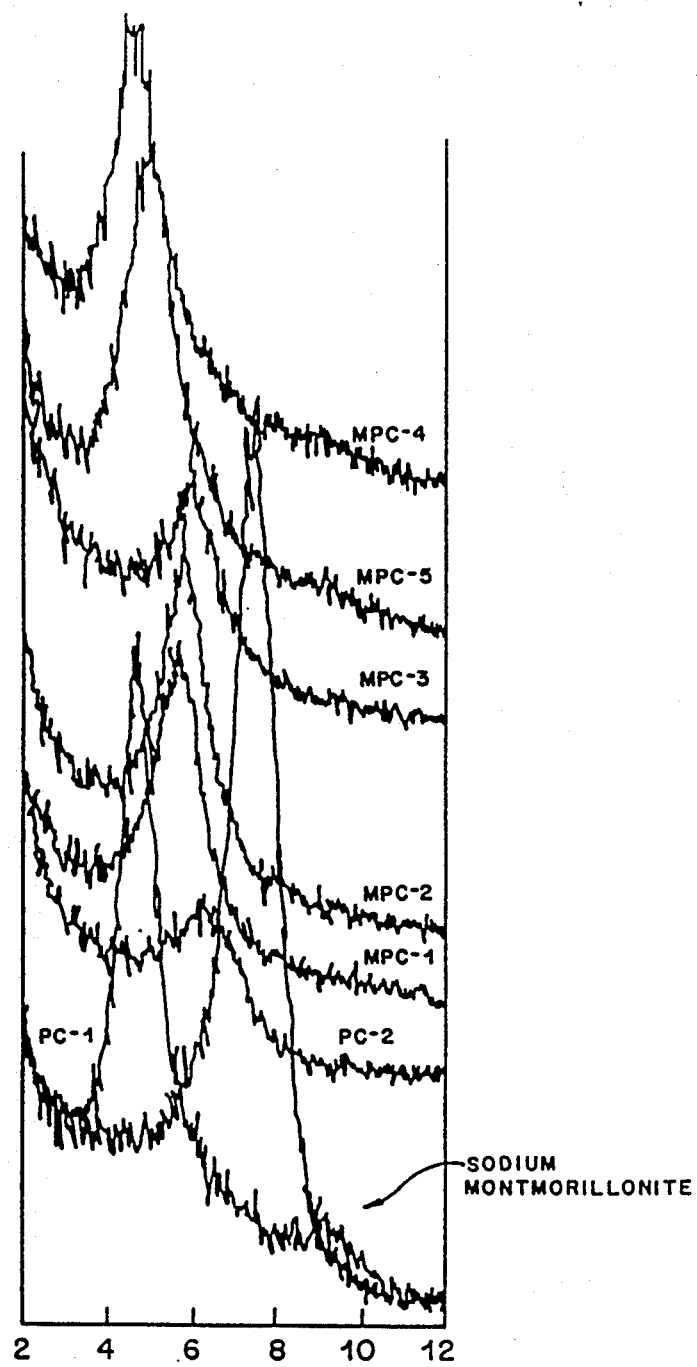
FIG. 3 shows the basal spacings of various clays after drying at room temperature.

The surface areas of all pillared clays, regardless of the method of preparation or pillaring species per se, are an order of magnitude higher than that of the starting clay, sodium montmorillonite, see Table 2. The increase in surface area is an indication of the better accessibility of the lattice surface, a direct consequence of layer expansion by pillaring, which is confirmed by simultaneous increase in the basal spacing, $d_{001}$, in the range of 2 to 7 Å, on pillaring, see Table 3 and FIG. 3.

Figure 5:
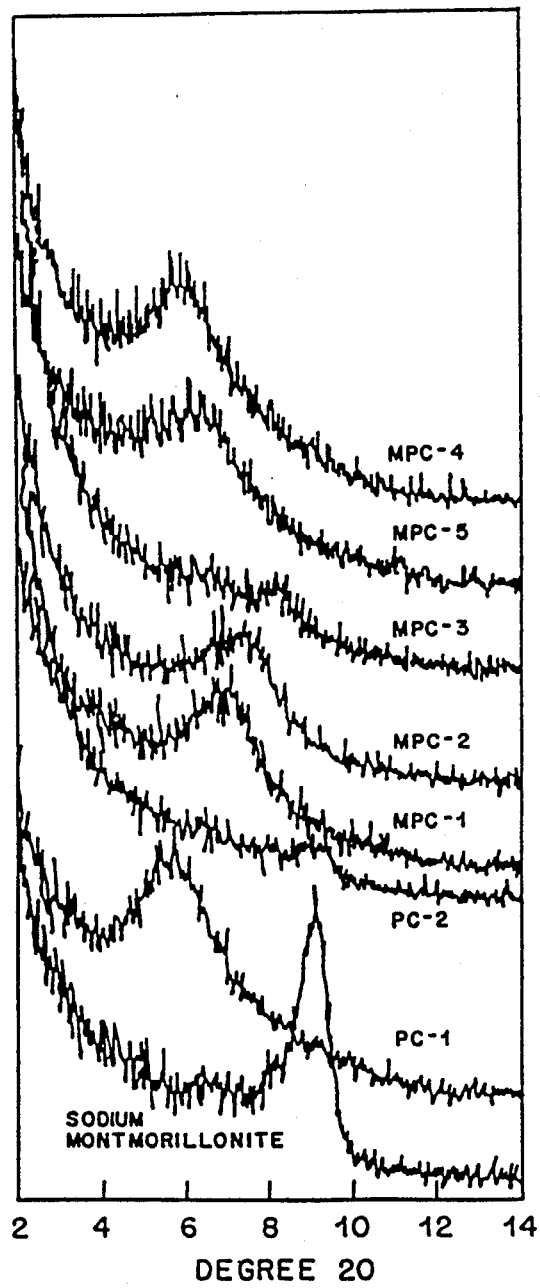
FIG. 5 shows the basal spacings of the clays after drying at 550° C.

The stability of the lattice expansion, the true distinction of pillaring, over the ordinary ion exchange process is discerned by subjecting sodium montmorillonite in comparison with pillared clays to various temperatures and monitoring the surface area in connection with lattice expansions. The data are compiled in Tables 2 and 3. It is expected that the lattice expansion would be maintained only in truly pillared clays when subjected to temperatures exceeding 250° C. Interlayer opening (ILO), indicator of lattice expansion, of simple ion exchanged clay, viz., sodium montmorillonite, after heating above 300° C. is about 0.5 Å. Except for PC-2, all MPCs and PCs under study exhibit ILO higher than 2 Å, even after subjection to 550° C., see FIG. 5, indicating true pillaring of the clays.

Figure 4:
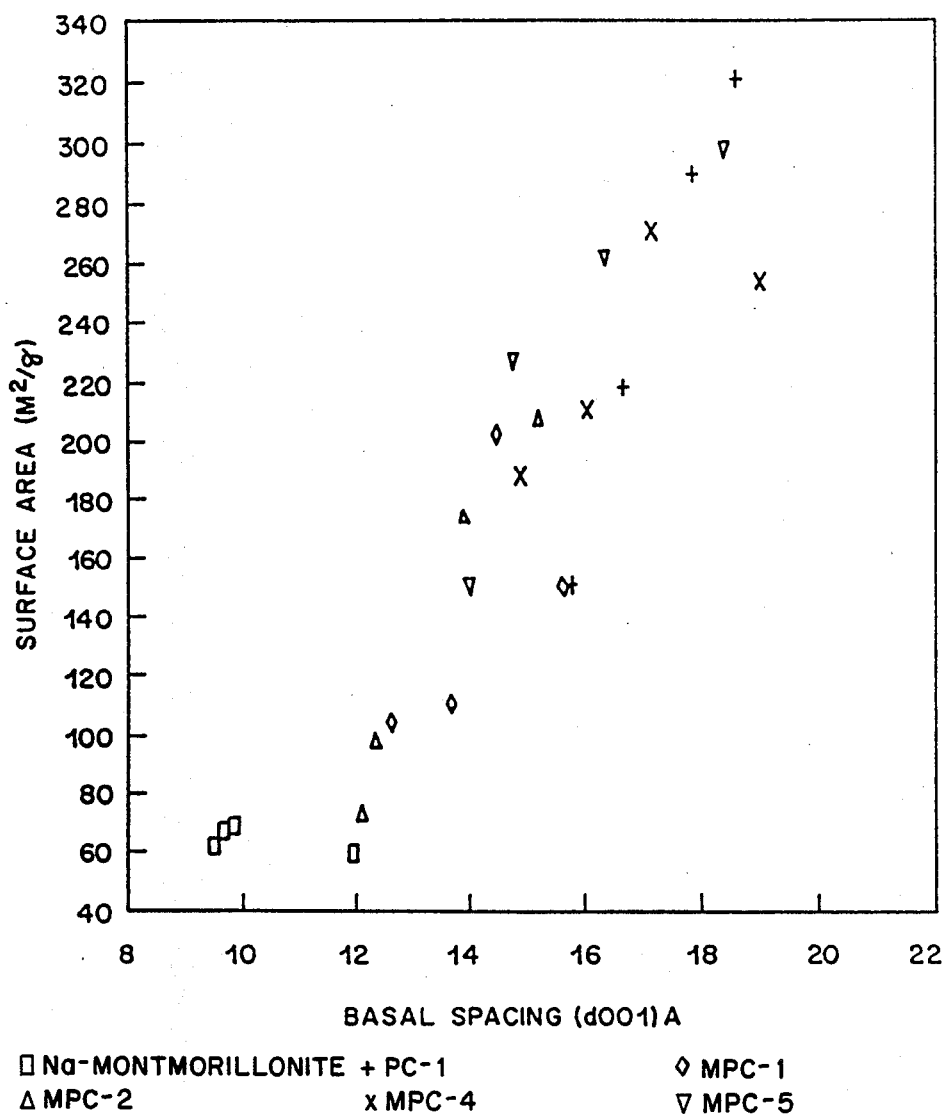
FIG. 4 shows the effect of basal spacing on surface area.

In general, and independently of the pillaring species, surface area decreases with increased temperature. In addition, decrease in surface area is accompanied by decrease in basal spacing. Typical trends of surface area vs. basal spacings are illustrated in FIG. 4.

Apparently PC-2 seems to exhibit an anomalous trend. The surface area of 219 $m^2/g$ is much higher than expected from the basal spacing of 9.68 Å. One possible explanation could be the spillover of pillaring species, $[Fe_3(OH)_4]^{5+}$, out of the interlayers on heating above 300° C. which would cause collapse of the lattice expansion. The observed high surface area can be associated with formation of external fine iron oxide, a consequence of this spillover.

Both lattice expansion and surface area of all MPCs fall between those of the two end member pillared clays, PC-1 and PC-2. In case of MPC 1 to 3, prepared using discrete hydroxy polymers, basal spacing decreases with increasing ferric ions in the hydroxy polymers. This trend persists at all temperatures, see Table 3. Such trend is expected based on the structural changes that can occur when aluminum is replaced by ferric ions in discrete hydroxy polymers. The same trend is seen in surface area for MPC 1 and 2 but not for MPC-3, Table 2. In this regard MPC-3 acts like PC-2. It is possible that under the given ferric ion substitution level, pillar structure breaks down much more rapidly followed by a spillover mechanism similar to that described for PC-2.

In the case of MPC-4 and MPC-5, both surface areas and basal spacings are like PC-1, see Tables 2 and 3, which supports the view that aluminum hydroxy polymers form stable pillars even at a level much lower than PC-1. In addition, these results are extremely important in demonstrating the feasibility of using a very small amount of inert pillars, for example aluminum hydroxy polymer, to achieve desired lattice expansion and using reactive pillars, such as iron hydroxy polymers, for further reactions. Thus other combinations such as Al hydroxy polymer with one or more of Fe, Cr, Co and Cu or other transition metal hydroxy polymer may be employed. The invention may therefore be employed to provide pillared clays that can be subjected to reduction to produce metal sites such as finely dispersed metallic iron domains, or in lieu of iron, other reducible and catalytically active metals. It is worth noting that even with MPC-4, and MPC-5, surface areas and basal spacings decrease with increasing amount of iron pillaring agents. However the effect is substantially lower than observed with MPCs prepared using discrete hydroxy polymers.

The surface areas and basal spacings of the MPCs clearly illustrate the formation of bimetallic pillars in the interlayers of montmorillonite and confirm that these species are unique and different. In addition this invention demonstrates the application of two distinctly different methods of preparing multi-metallic pillared clays. However the choice of method would depend upon the eventual objective and intended applications. The use of one discrete hydroxy polymer would enable substitution of active metallic centers within the matrix of inert pillars, see FIG. 2B, whereas the stoichiometric process would be useful to produce active pillars aided by inert pillars to keep the lattice expanded, see FIG. 2A.

It can thus be seen that mixed pillared clays exhibit good thermal stabilities and higher surface areas.

Clays intercalated with discrete aluminum pillars such as PC-1, MPC-4 and MPC-5 have higher surface areas ($\geq 240$ $m^2/g$) and larger d-spacings ($\geq 1.84$ nm)( than PC-2 and alloy mixed pillared clay materials. These values suggest that discrete aluminum pillars are in fact derived from $Al_{13}O_4(OH)_{24}^{+7}$ species. The smaller surface area of MPC-5 is most likely due to the decreased number of aluminum pillars.

The MPCs prepared by intercalation of one discrete hydroxy polymer tend to be the less stable of the two types shown. The stability of the MPCs depends on the amount of iron substitution or the amount of iron pillaring agent used.

Figure 7A:
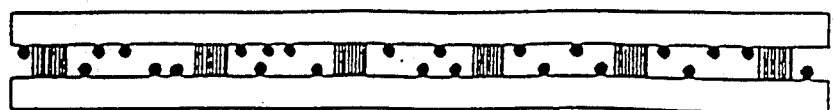
FIGS. 7-a, 7-b and 7-c show a schematic representation respectively of a mixed pillared clay as prepared, after reduction and upon subsequent oxidation.
Figure 7B:
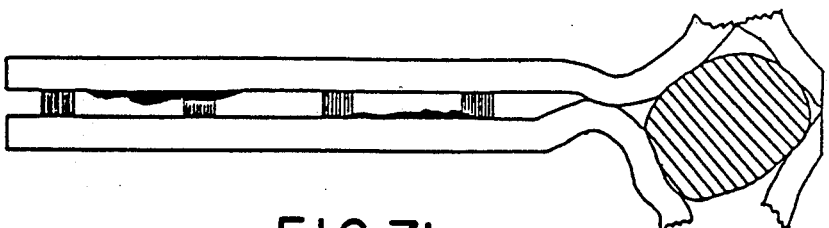
Figure 7C:
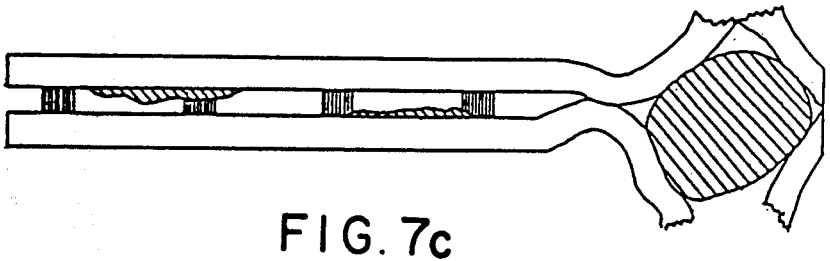

MPC-5 contains more iron pillars than aluminum pillars by a factor of 4.2. Also, its d-spacings (ca. 1.84 nm) and surface area (ca. 240 $m^2/g$) clearly indicate the presence of the aluminum pillars derived from mononuclearic $Al_{13}O_4(OH)_{24}^{+13}$ species, which are much larger in size than the iron pillars. Based on this evidence, the schematic shown in FIG. 7-a is believed to be a representation of this sample prior to reduction.

The d-spacing of the reduced clay (ca. 1.7 nm) and surface area (ca. 200 m²/g) indicate that the expanded structure is still intact following reduction up to 673° K. as expected from the presence of the more reduction-resistant aluminum pillars. This expanded structure, stable even after reduction, is responsible for more reduction of iron to the metallic state in MPC-5 (ca. 45.5%) compared to that in PC-2 (15.5%). It is believed that reduction of iron atoms in PC-2 is limited by the collapsed structure (i.e., not accessible to the gas phase). The metallic iron particles in the reduced MPC-5 are believed to be in the form of pancake-shape islands (see top view shown in end portion of FIG. 7-b) where a large fraction of iron atoms are exposed to the gas phase. The fact that all the metallic component is oxidized to $Fe^{+3}$ upon the slow passivation to air (see FIG. 7-c) proves again that the iron islands are indeed thin and exposed to the ga phase.

Since it is generally recognized that iron particles supported on silica do not wet the surface, the thin and accessible nature of these crystallites must be related to the presence of the layered lay structure.

Reduction Behavior

Figure 2A:
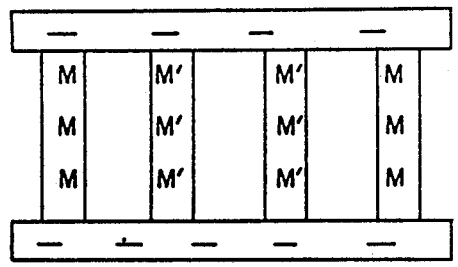
FIG. 2A illustrates the hypothetical schematic structure for pillaring with mixed metal hydroxy polymers.
Figure 2B:
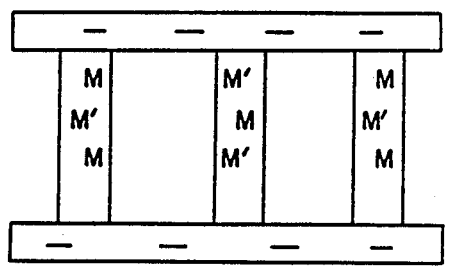
FIG. 2B illustrates the hypothetical schematic structure for pillaring with a discretely synthesized multi-metallic hydroxy polymer, viz., alloy pillars.

In a reduction study, reduction was carried out of mixed pillared clays prepared by treating a smectite clay with a discrete hydroxy polymer of aluminum and a discrete hydroxy polymer of iron, e.g., MPC-4 and preferably MPC-5 in which a higher proportion of the Fe polymer was used. The configuration of this type of mixed pillared clay is schematically illustrated in FIG. 2A. Investigation of the products indicated that the pillars comprising Fe in an oxidized state underwent reduction in a reducing atmosphere at elevated temperature to produce metallic iron domains whereas the Al-containing pillars were sufficiently stable to continue to serve as props to keep the clay layers separated.

Figure 6:
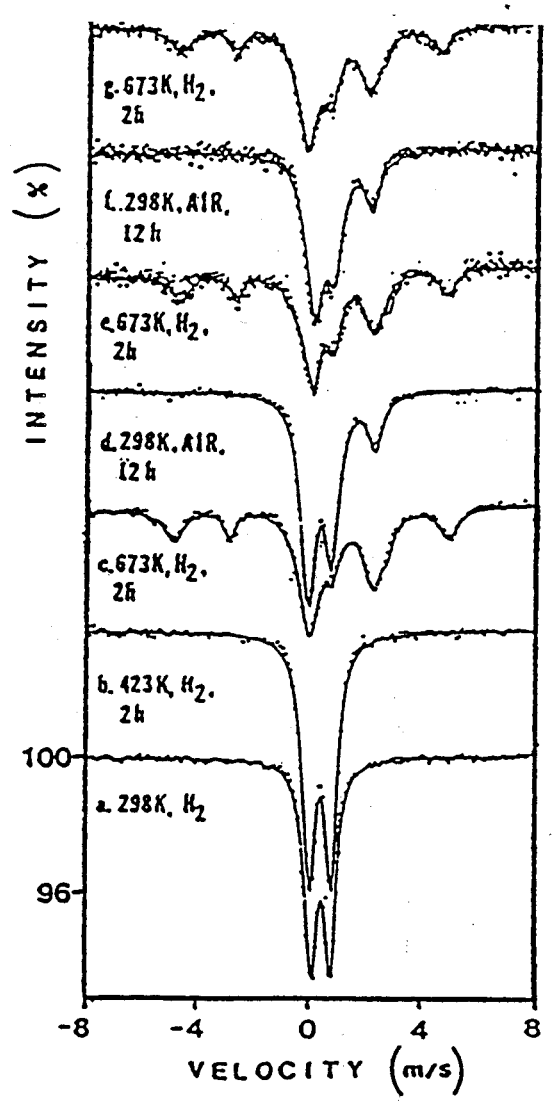
FIG. 6 provides Mossbauer spectra of a mixed pillared clay after various reduction/oxidation treatments.

A sample of MPC-5 was subjected to reduction with hydrogen gas for two hours at 673° K. The Mossbauer spectral area belonging to metallic iron was 45.5% as compared with a similarly treated sample of PC-2 where this spectral area was only 15.5%. Also, the oxidation behavior was different from PC2 in that all of the metallic component could be oxidized back to $Fe^{+3}$ following exposure to air, see FIG. 6. Thus, a sample of MPC-5 was subjected to the following treatment sequence: (1) reduction at 673° K. in flowing hydrogen gas for 2 hours, (2) exposure to air at 298° K. for 12 hours and (3) reduction again in hydrogen at 673° K. for 2 hours. The last two steps were repeated. Observations made following each redox cycle indicated that the reduced iron particles could be reformed to their initial dimensions in the absence of sintering during the redox cycles.

The small hyperfine fields and broadened Mossbauer lines observed in the Mossbauer spectra of PC-2 and MPC-5 have suggested the formation of metallic iron domains, which are in the form of thin-film/pancake-type islands. Also, TEM and CAEM results have indicated that large iron oxide particles are formed in these clays containing discrete iron pillars.

Some clay samples were impregnated with ca. 1.0 wt% platinum in separate experiments. In these cases aqueous solutions of chloroplatinic acid (Alfa Products, 99.9% purity) of appropriate concentration were added in a dropwise fashion to the dried pillared clays until incipient wetness was achieved (ca. 0.25 cm³/g). These specimens were then dried in air for 12 h at room temperature prior to reduction.

Reduction with hydrogen gas to the iron phase can be enhanced by addition of platinum to the sample. For PC-2, the amount of metallic iron increased from 15.5% to 62.8% after platinum addition. For MPC-4, the formation of a major $Fe^{+2}$ phase and a small amount of metallic iron (ca. 10.3%) were only observed after platinum had been added. In the presence of platinum, a vast majority of iron atoms (ca. 80.4%) were reduced to $Fe^{+2}$ following reduction at 423° K. It should also be noted that the amount of $Fe^{+3}$ reduced to $Fe^{+2}$ for platinum-containing MPC-4 specimens was greater than that obtained from the platinum-containing PC-2 sample at these same reduction conditions (i.e., 15.2% $Fe^{+2}$). The spectral area associated with $Fe^{+2}$, steadily increased with reduction temperature until at 673° K., 10.3% of the spectral area resulted from metallic iron. Following passivation in air, the metallic iron and $Fe^{+2}$ components were oxidized almost completely to $Fe^{+3}$.

In the above-described experiments with platinum, the underlying physical effect could also be obtained using Pt, Pd, Ni, or any other easily reduced metal species which promotes hydrogen spillover to, and subsequent reduction of, a more difficult to reduce metal/metal oxide such as Fe or Co. These experiments illustrate reduction of iron pillars in the presence of a promoter which promotes hydrogen spillover, to form reduced products of $Fe^{+3}$ comprising $Fe^{+2}$. Thus, it has now been found that Pt addition to MPC-4 (see Table 1) results in an $Fe^{+2}$ decoration of the surfaces of the aluminum oxide pillars. This oxidation state is believed to be particularly active for olefin polymerization, partial oxidation catalysis and other reactions involving acid-catalyzed reaction mechanisms. In addition to the formation of the two types of pillars shown in FIGS. 2A and 2B, this finding provides the basis for an additional type of mixed pillared system where the core and skin of the resultant pillars have different and controlled compositions.

By studying pillared clays containing mixed metal complexes with Mossbauer spectroscopy, X-ray diffraction (XRD), BET surface area measurements, controlled atmosphere electron microscopy (CAEM) and transmission electron microscopy (TEM), the following conclusions were made concerning the structural stability of mixed pillared clays and the reduction behavior of iron pillars:

XRD and Mossbauer results demonstrated that mixed pillared clays (i.e., MPC-4 and MPC-5) contained discrete iron pillars and discrete aluminum pillars, not iron-aluminum complex mixtures.

The expanded structures of pillared clays containing discrete aluminum pillars (i.e., PC-1, MPC-4 and MPC-5) were stable following reduction up to 673° K., due to the irreducible nature of the discrete aluminum pillars at these conditions. At suitable iron pillar to aluminum pillar ratios, results obtained also indicated that at least one monolayer of $Fe^{+2}$ was preferentially decorated/accommodated at the surfaces of the aluminum oxide pillars. This behavior was attributed to the stronger interaction of iron with alumina as compared with silica and was triggered at temperatures up to 673° K. by introducing platinum, and presumably hydrogen atoms, to the specimen.

The expanded structure of pillared clays containing only discrete iron pillars (i.e., PC-2) collapsed after reduction at 673° K.

Metallic iron domains were formed in the interlayer space following reduction of PC-2 and MPC-5 at 673° K. as indicated by the appearance of magnetically-split Mossbauer peaks.

The magnetic properties and oxidation behavior deduced from Mossbauer spectroscopy (e.g., small hyperfine fields and complete oxidation from the metallic state to the ferric state upon passivation to air) strongly indicated that these metallic iron domains were in the form of thin-film/pancake-shape islands. The morphology of these particles is also inferred from the relatively intact nature of the clay structure as shown by BET and XRD. For pillared clays, it is likely for metallic iron to be in the form of the thin film/pancake-type islands conforming to the geometry of the interlayer region since the layered structure of clays is expected to inhibit nucleation of iron into a three dimensional domain.

Reduced metallic iron domains of MPC-5 remained accessible to the gas phase and resisted sintering during the reduction and oxidation cycles.

In summary, pillared clays containing the mixtures of discrete iron pillars and discrete aluminum pillars were prepared. These clays, on reduction, possessed many desirable properties of catalysts, e.g., high surface area, thermal stability up to 723° K., high dispersion of surface metal atoms and sintering-resistant behavior. Therefore, intercalation of clays with mixtures of chemically distinct pillars appears to provide a unique way for preparing highly dispersed metallic or bimetallic catalysts possessing two-dimensional sieve-like behavior.

TABLE 1
List of Pillared and Mixed Pillared Clays

| Designation of Clays | Pillaring Cations | Percent CEC | Sample Classification |
|---|---|---|---|
| PC-1 | $[Al_{13}O_4(OH)_{24}]Cl_7$ | 100 | Discrete |
| PC-2[a] | $[Fe_3(OH)_4]Cl_5$* | 100 | Discrete |
| MPC-1[a] | $[Al_{12.5}Fe_{0.5}O_4(OH)_{24}]Cl_7$ | 100 | Discrete |
| MPC-2 | $[Al_{10}Fe_3O_4(OH)_{24}]Cl_7$ | 100 | Discrete |
| MPC-3 | $[Al_6Fe_7O_4(OH)_{24}]Cl_7$ | 100 | Discrete |
| MPC-4[a] | $[Al_{13}O_4(OH)_{24}]Cl_7$ | 50 | Stoichio- |
|  | $[Fe_3(OH)_4]Cl_5$* | 50 | metric |
| MPC-5[a] | $[Al_{13}O_4(OH)_{24}]Cl_7$ | 25 | Stoichio- |
|  | $[Fe_3(OH)_4]Cl_5$* | 75 | metric |

*The exact chemical composition of iron hydroxy polymer formed in solution is not fully established. Thus we have used this composition for all practical calculations based on most stable species.
[a]These MPCs were also prepared using $^{57}$Fe enriched hydroxy polymers.

TABLE 2
Nitrogen BET Surface Area of Pillared and Mixed Pillared Clays After Treating at Various Temperatures[a]

| | Surface Area $M^2/G$ | | | |
|---|---|---|---|---|
| Clays | 25° C. | 300° C. | 450° C. | 550° C. |
| Na-Clay | 60 | 62 | 69 | 67 |
| PC-1 | 320 | 289 | 218 | 151 |
| PC-2 | 218 | 213 | 214 | 219 |
| MPC-1 | 150 | 202 | 110 | 104 |
| MPC-2 | 208 | 175 | 98 | 73 |
| MPC-3 | 254 | 248 | 238 | 211 |
| MPC-4 | 253 | 270 | 210 | 188 |
| MPC-5 | 297 | 261 | 227 | 150 |

[a]Clays were heated at appropriate temperature for 45 minutes and cooled in a desiccator.

TABLE 3
Basal Spacing of Pillared and Mixed Pillared Clays After Treating at Various Temperatures[a]

| | Basal Spacing $d_{001}$Å | | | |
|---|---|---|---|---|
| Clays | 25° C. | 300° C. | 450° C. | 550° C. |
| Na-Clay | 11.94 | 9.5 | 9.85 | 9.66 |
| PC-1 | 18.59 | 17.84 | 16.66 | 15.77 |
| PC-2 | 13.80 | 9.71* | 10.74* | 9.68* |
| MPC-1 | 15.63 | 14.48 | 13.69 | 12.62* |
| MPC-2 | 15.22 | 13.91 | 12.35* | 12.1* |
| MPC-3 | 14.72 | 13.91* | 12.44* | 13.2* |
|  |  |  |  | 10.7* |
| MPC-4 | 18.99 | 17.14 | 16.05 | 14.90* |
| MPC-5 | 18.39 | 16.35 | 14.78 | 14.00[b] |

[a]Clays were heated at appropriate temperature for 45 minutes and cooled in a desiccator prior to basal spacing measurements.
*Basal spacing were highly interstratified.
[b]The $d_{001}$ peak was relatively broad.

What is claimed is:

1. A method of making a catalytic composition which comprises preparing a mixed pillared clay by steps including forming an aluminum hydroxy polymer and forming a transition metal hydroxy polymer, in the liquid phase, and mixing said liquid phase polymers with a swelling clay to form a mixed pillared clay, using a proportion of each individual polymer that will satisfy a selected percentage of the cation exchange capacity of the clay, and subjecting the mixed pillared clay to a reducing atmosphere to produce metallic transition metal domains.

2. A method as set forth in claim 1 in which one or more than one transition metal hydroxy polymer may be employed wherein the metal is selected from the class consisting of Fe, Cr, Co and Cu.

3. A method as set forth in claim -2 in which the mixed pillared clay is subjected to a reducing atmosphere in the presence of a promoter comprising a metal species more easily reducible than said transition metal hydroxy polymer.

4. A method as set forth in claim 1 which comprises preparing a mixed pillared clay by steps including forming an aluminum hydroxy polymer and forming an iron hydroxy polymer, in the liquid phase, and mixing said liquid phase polymers with a swelling clay to form a mixed pillared clay, using a proportion of each individual polymer that will satisfy a selected percentage of the cation exchange capacity of the clay, and subjecting the mixed pillared clay to a reducing atmosphere to produce metallic iron domains.

5. A method as set forth in claim 4 in which the proportion of said aluminum hydroxy polymer will satisfy from about 25% to about 50% of the cation exchange capacity of the clay and the proportion of the iron hydroxy polymer will satisfy from about 75% to about 50%.

6. A method of making a catalytic composition which comprises treating a swelling clay with a discrete hydroxy polymer of aluminum and a discrete hydroxy polymer of a transition metal to produce a mixed pillared clay, and subjecting the treated clay to a reducing atmosphere to produce metallic transition metal domains.

7. A method as set forth in claim 6 which comprises treating a smectite clay with a discrete hydroxy polymer of aluminum and a discrete hydroxy polymer of iron to produce a mixed pillared clay having iron-containing pillars and aluminum-containing pillars, and subjecting the treated clay to a reducing atmosphere at elevated temperatures no higher than about 723° K. to produce metallic iron domains while the aluminum-containing pillars remain sufficiently stable to continue to serve as props to keep the clay layers separated.

8. The method as set forth in claim 7 in which the metallic iron domains have the form of thin, flat islands.

9. A method of making a catalytic composition which comprises treating a swelling clay with a discrete hydroxy polymer of aluminum and a discrete hydroxy polymer of iron to produce a mixed pillared clay having iron-containing pillars and aluminum-containing pillars, and subjecting the treated clay to a reducing atmosphere in the presence of a promoter comprising a metal species more easily reducible than said iron-containing pillars to form reduced products comprising $Fe^{+2}$.

10. A method as set forth in claim 9 in which the promoter is selected from the group consisting of compounds of platinum, palladium and nickel.

11. A method as set forth in claim 10 in which said promoter is a platinum compound.

12. As a catalytic composition, a reduced mixed pillared swelling clay which comprises aluminum-containing pillars and reduction products of transition metal-containing pillars comprising metallic transition metal domains having the form of thin, flat islands.

13. As a catalytic composition according to claim 12, a reduced mixed pillared clay which comprises aluminum-containing pillars and reduction products of iron-containing pillars comprising metallic iron domains having the form of thin, flat islands.

14. As a catalytic composition, a reduced mixed pillared smectite clay which comprises pillars of a metal in an oxidized state that is thermally stable and reduction products of chemically distinct transition metal-containing pillars comprising metallic transition metal domains having the form of thin, flat islands.

15. As a catalytic composition, a reduced mixed pillared smectite clay which comprises aluminum-containing pillars and reduction products of iron-containing pillars comprising an $Fe^{+2}$ surface formation on the surfaces of the aluminum-containing pillars.

* * * * *